United States Patent Office 2,859,630
Patented Nov. 11, 1958

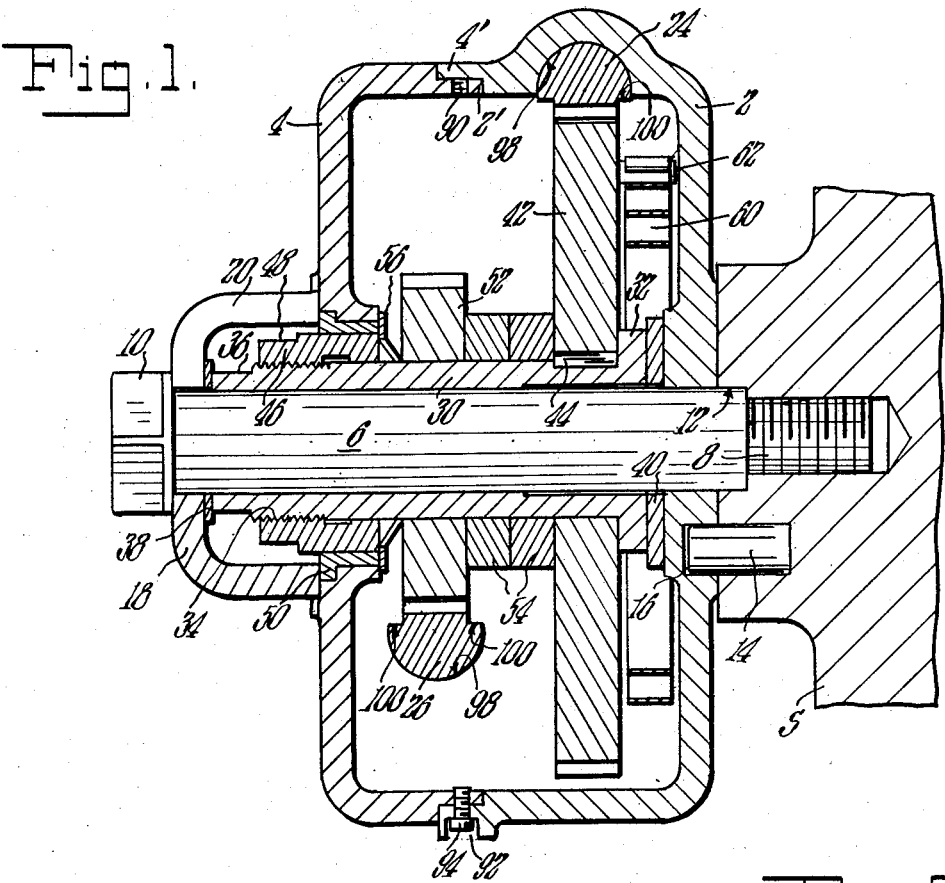

2,859,630

MOTION TRANSMITTING MECHANISM

Philip J. Hatch, Holyoke, Mass.

Application August 27, 1956, Serial No. 606,327

4 Claims. (Cl. 74—110)

This invention relates to motion transmitting mechanism.

The principal objects of the invention are directed to the provision of mechanism for the transmitting of motion from one element to another, which said elements may be of one machine or apparatus or of separate, different machines.

In machines and apparatus, various elements are operatively connected or engaged by intermediate elements, which in many cases result in complicated combinations, which combinations are not only costly but also require considerable maintenance.

According to the novel features of this invention, a novel mechanism is provided wherein reciprocable, gear-connected racks, may be connected to separated elements for operating one from the other.

Either one of the racks may be the driving or operating rack, while the other is the driven rack.

According to a special feature on the invention, means is provided for positioning the racks in various relative positions of their longitudinal axis. This makes it possible to transmit motion from one element to another and to accommodate the mechanism to their particular relationship.

All of the above objects and advantages are accomplished by a novel arrangement and combination of elements as will appear by the following description and drawings wherein:

Fig. 1 is a longitudinal sectional view through motion transmitting mechanism embodying the novel features of the invention;

Fig. 2 is a rear end elevational view of the mechanism shown in Fig. 1;

Fig. 3 is a plan view of the outer end of the central shaft and cover of the mechanism;

Figure 4:
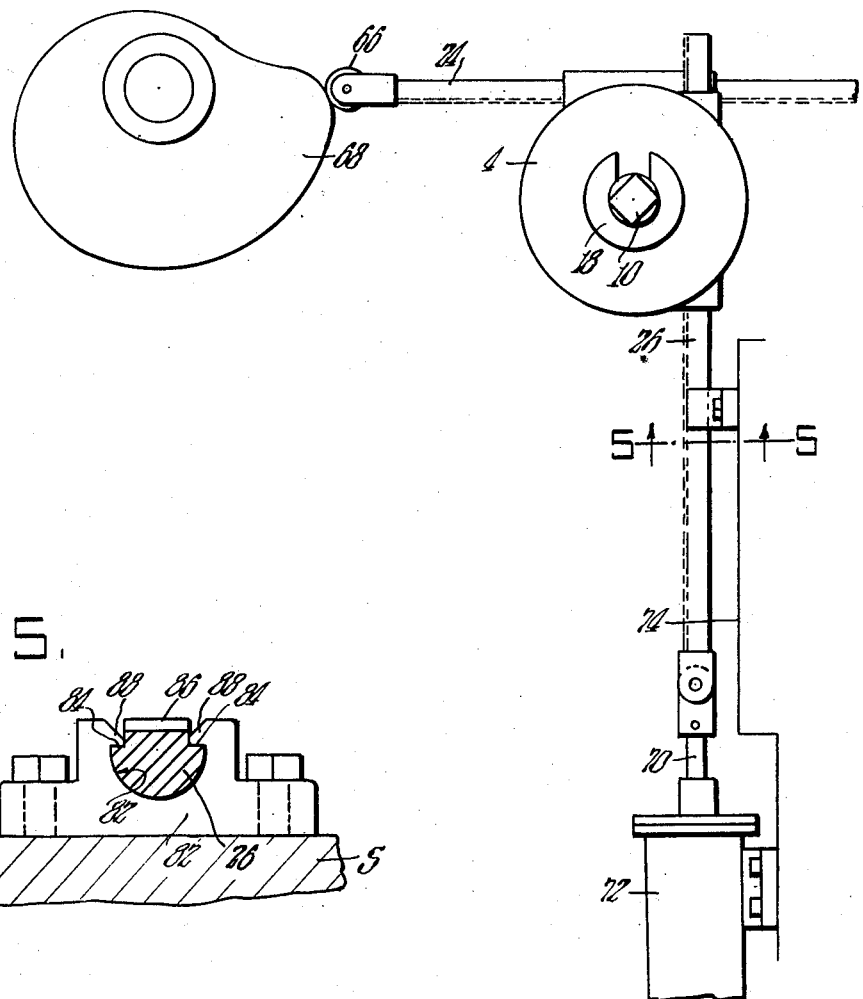
Fig. 4 is a diagrammatic plan view showing the mechanism in operable connection with driving and driven components.
Figure 5:
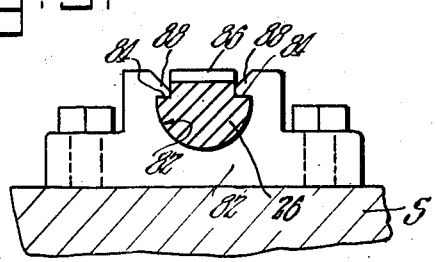
Fig. 5 is a sectional view on the line 5—5 of Fig. 4.
Figure 6:
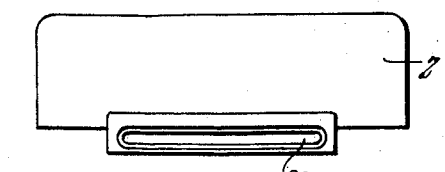
Fig. 6 is a side elevational view of the inner member or base of the housing of the mechanism.

Referring now to the drawings more in detail, the invention will be fully described.

A housing includes an inner member or base 2 and a closure or cover 4, which are provided with interfitting annular rims 2' and 4' respectively, as shown in Fig. 1. An elongated supporting stud 6 has an inner threaded end 8 and a head 10. The housing is secured to a support, such as S, which may be a machine with which the mechanism is to be used. The support S is provided with a socket 12 in which the end of the stud is received and with a tapped opening in which the threaded stud end is engaged, as shown.

The base 2 is held against turning on the support S by one or more dowels 14 carried by the said support, which are receivable in sockets such as 16 provided in the said base 2.

A cap 18 is provided, which has a slot 20 that is slidable on the outer side of the cover 4 beneath the head 10 of the stud 6 and onto and off of said stud.

Elongated racks 24 and 26 are slidable in the base 2 and cover 4. One such rack, as 24, may be the driver and the other 26 may be the driven element, or vice versa, as may be desired.

An elongated sleeve 30 is rotatable on the stud 6 and has an inner annular flange 32. An outer end portion of said sleeve is provided with a screw thread 34 and the outer extremity is flattened at 36 for engagement by a tool, such as a wrench, or the like. Thrust washers 38 and 40 are provided at opposite ends of the sleeve 30, one against the base 2 and the other against the cap 18.

A gear 42 in mesh with the rack 24 is secured to the sleeve 30 as by a key 44, or the like. A clamp nut 46 in threaded engagement with the sleeve 30 is provided on its outer end with a flattened portion 48 for engagement by a tool, or the like. The nut 46 is rotatable in a bushing 50 of the cover 4, as shown.

A gear 52 is rotatable on the sleeve 30 and is in mesh with the rack 26. Thrust washers 54 are disposed between the gears 42 and 52, as shown. A spring washer 56, of usual form, is disposed between the nut 46 and gear 52.

As shown in Fig. 1, the cover 4 is clamped to the base 2, and the gears 42 and 52 are clamped or operatively locked together. Movement of one rack is imparted to the other through the gears and sleeve.

The gears 42 and 52 are clamped together and held against relative rotation by the nut 46 which is screwed on the outer end of the sleeve 30 so as to urge the spring washer 56 against gear 52 whereby said gear is urged against the thrust washers 54, which in turn are pressed against gear 42.

The racks may be positioned or adjusted to various desired relations instead of the parallel relationship thereof, as shown in Figs. 1 and 2, by releasing the cover from the base and unlocking the gears.

To accomplish adjustment of the racks, the stud 6 is backed off and the cap 18 is removed from beneath the head 10 of said stud 6. The flattened ends 36 and 48 of the sleeve 30 and nut 46 are engaged by tools, in such a way as to back off the said nut. The gears 42 and 52 are thereby released from locked engagement, and the cover 4 may be rotated relative to the base angularly to position the rack 26 relative to rack 24, as may be desired.

The angular relationship of the racks will be such as will accommodate the mechanism to a particular situation.

Subsequent to adjustment, the nut 46 is tightened on the sleeve to clamp the gears 42 and 52 by means of the sleeve flange 22 and washers. The sleeve and gears then operate as a unit, as they are operatively locked together.

The cap 18 is slipped onto the stud 6 beneath the head 10 thereof and then the said stud is tightened so that the cap 18 forces the cover 4 against the base, as shown in Fig. 1. The cap covers the nut and end of the sleeve.

The gears 42 and 52 may be of any desired ratio and are rotated in driving or propelling directions against spring means, which returns them in non-propelling direction.

Such spring means preferably includes a coil spring 60 of as many convolutions as may be desired, which has its opposite ends in engagement with anchors 62 and 64 of the gear 42 and base 2 respectively. Various, well-known means may be employed for anchoring the ends of the spring to the gear 42 and base 2.

In Fig. 4, the cover has been positioned on the base to position the racks 24 and 26 at right angles to one another. The propeller rack 24 is provided with a roll 66 in contact with a cam 68, which is shown for illustration purposes. As the cam rotates, the propeller rack is reciprocated in propelling direction to reciprocate the outer rack in actuating direction. For purposes of disclosure, the rack 26 is shown as connected to the rod of a cylinder device, which is secured to a support 74.

The rod 24 may be operated by one element and the rod 26 may actuate another element of the same machine or apparatus. Otherwise, motion may be transmitted by the element of one machine or apparatus to an element of another machine or apparatus, all as may be desired.

Novel guide means for a rack is provided and is indicated by 80. Said guide is adapted for securement to a support such as 74 and is provided with a seat 82 in which a rack, such as 26, is slidable. The rack is provided with longitudinal ledges 84 along opposite sides of the teeth 86 thereof. The guide has hold down portions 86 beneath which the ledges slide and which guide the rack for sliding in the seat. Thus a rack is guided and supported for reciprocation.

Means for securing the cover 4 in adjusted positions to the base 2 include a plurality of tapped holes 90 in the cover rim and an elongated slot 92, provided in a side of the base 2. A screw 94 is insertable through the slot 92 into engagement with a hole 90 and on tightening, the screw locks the base and cover against relative turning.

As stated, the gears of the mechanism may be of any desired ratio, while the racks may be of such a length as may be necessary in a particular situation. By adjusting the relationship of the racks, the mechanism may be used for operatively connecting various elements of the same or of different or separate machines.

It will be noted that the racks are formed from cylindrical stock with teeth along one side thereof and ledges 84 along opposite ends of the teeth.

The base and cover slidably receive the racks and have journals formed with cylindrical portions 98 for the cylindrical portions of the racks and lip portions 100 for the ledges 84 thereof which hold the racks against turning.

One or both of the racks may be provided with stop means to limit movement brought about by action of the spring means.

While the invention has been described as embodied in a specific arrangement, it is not intended to be limited thereby as changes and modifications may be made without departing from the spirit and scope of the invention.

What it is desired to claim and secure by Letters Patent of the United States is:

1. Motion transmitting mechanism comprising in combination, a hollow base and a hollow cover therefor arranged and cooperating therewith to form a closed hollow housing, an elongated stud extending through said base and cover for supporting the housing and having an inner end for securing the housing to a support, separate racks reciprocable in opposite directions in said base and cover respectively on longitudinal axes and being disposed transversely to the longitudinal axis of said stud, said base and cover having interfitting portions and said cover being adjustable circumferentially of said base to position said racks in various relative angular positions, means to secure said cover to said base in various positions of adjustment thereon, an elongated sleeve in said housing rotatable on said stud, a first gear fixed to an inner end portion of the sleeve in engagement with the rack reciprocable in said base, a second gear rotatable on said sleeve in engagement with the rack reciprocable in said cover, and means for holding said gears against relative rotation.

2. Motion transmitting mechanism set forth in claim 1 wherein the means to secure the cover to the base in various positions of adjustment includes an elongated circumferential slot provided in the cover and a plurality of circumferentially spaced tapped holes provided in the base which are registrable with said slot and a binding screw extending through said slot for engagement with any one of said tapped holes.

3. Motion transmitting mechanism set forth in claim 1 wherein the means for holding the gears against relative rotation includes; thrust washers movable axially on said sleeve between adjacent sides of said gears, a spring washer on said sleeve at the outer side of said second gear, and a nut in threaded engagement with the outer end of said sleeve outside of said spring washer, whereby as said nut is turned in one direction said spring washer and second gear and thrust washers are urged towards said first gear.

4. Motion transmitting mechanism comprising in combination, a hollow base and a hollow cover therefor arranged and cooperating therewith to form a closed hollow housing, an elongated stud extending through said base and cover for supporting the housing and having an inner end for securing the housing to a support, separate racks reciprocable on longitudinal axes in opposite directions in said base and cover respectively and being disposed transversely to the longitudinal axis of said stud, said base and cover having interfitting portions and said cover being adjustable circumferentially of said base to position said racks in various relative angular positions, means to secure said cover to said base in various positions of adjustment thereon, an elongated sleeve rotatable on said stud in said housing, a first gear fixed to the inner end portion of the sleeve in engagement with the rack reciprocable in said base, a second gear rotatable on said sleeve in engagement with the rack reciprocable in said cover, and means for holding said gears against relative rotation, and means resiliently resisting rotation of said first gear and sleeve in one direction.

References Cited in the file of this patent

UNITED STATES PATENTS

| | | |
|---|---|---|
| 1,727,984 | Johnson | Sept. 10, 1929 |
| 2,026,459 | Caretta | Dec. 31, 1935 |
| 2,675,835 | Kiekhaefer | Apr. 20, 1954 |